United States Patent [19]

Say

[11] Patent Number: 5,078,077

[45] Date of Patent: Jan. 7, 1992

[54] INDICATOR CAP

[76] Inventor: James L. Say, 4315 2nd Ave., North, St. Petersburg, Fla. 33713

[21] Appl. No.: 550,162

[22] Filed: Jul. 9, 1990

[51] Int. Cl.[5] .............................................. G01F 23/00
[52] U.S. Cl. ....................................... 116/227; 73/323
[58] Field of Search ...................... 73/290 B, 303, 323; 116/227, DIG. 8

[56] References Cited

U.S. PATENT DOCUMENTS

| 1,477,145 | 12/1923 | Marone | 116/227 |
| 3,103,816 | 9/1963 | Kowecki | 73/323 |

FOREIGN PATENT DOCUMENTS

| 679804 | 8/1979 | U.S.S.R. | 116/227 |
| 2082773 | 3/1982 | United Kingdom | 73/323 |

Primary Examiner—William A. Cuchlinski, Jr.
Assistant Examiner—W. Morris Worth
Attorney, Agent, or Firm—Dominik, Stein, Saccocio, Reese, Colitz & VanDerWall

[57] ABSTRACT

The indicator cap for a dishwasher rinse agent reservoir comprising an elongated body having a head portion forming a cavity and a depending neck portion. The neck portion is operatively designed to sealingly engage the opening in the rinse agent reservoir. The neck portion comprises two fluid passageways extending from the lowermost tip of the neck portion, through the neck portion and into the cavity of the head portion.

3 Claims, 2 Drawing Sheets

INDICATOR CAP

BACKGROUND OF THE INVENTION

1. Field of the Invention

This invention relates to caps for indicating a low level of fluid in a reservoir. More particularly, this invention relates to an indicator cap for a dishwasher rinse agent dispenser to visually indicate a low level of rinse agent in the dispenser's reservoir.

2. Description of the Background Art

Household dishwashers usually employ the use of a rinse agent to reduce the surface tension on the dishes being cleaned causing water to flow off of the dishes quicker. Water spotting is therefore substantially reduced.

Typically, dishwasher rinse agent dispensers are positioned on the inside of the dishwasher door. When the dishwasher door is in its opened, horizontal position, the dispenser's reservoir is capable of being filled with the rinse agent via a screw cap. Usually, the dispenser's reservoir is sized to hold approximately four ounces of rinse agent, which lasts approximately three months during normal household use.

Unfortunately, the consumer often neglects to periodically unscrew the fill cap to visually check the level of rinse agent in the reservoir. Because of such inadvertness, all of the rinse agent in the reservoir is often dispensed and water spotting on the dishes resumes. Only after repeated washing without a rinse agent is the water spotting eventually noticed by the consumer. Often, the depletion of the rinse agent still goes unnoticed, and the spotting is wrongly blamed on the dishwasher, or the dishwasher soap.

Hence, there exists a need for indicating to the consumer a low level of rinse agent in the dispenser's reservoir so that additional rinse agent can be timely purchased and the reservoir refilled prior to depletion of the rinse agent.

Therefore, it is an object of this invention to provide an indicator cap for indicating a low level of rinse agent in a reservoir of a dishwasher rinse agent dispenser, the indicator cap comprising a body including a head portion having a cavity formed therein and a neck portion, means for sealing by vertically mounting the body into an opening in the reservoir with the neck portion extending downwardly into a bottommost area of the reservoir, a fluid passageway extending through the neck portion from an opened terminal end thereof to the cavity of the head portion, and visual pump means for pumping rinse agent through the first fluid passageway into the cavity to visually indicate the presence of the rinse agent in the cavity, whereby, air is allowed to flow upwardly through the first fluid passageway when the level of rinse agent in the reservoir is below the opened terminal end of the first fluid passageway causing drainage of rinse agent in the cavity to visually indicate a low level condition.

Another object of this invention is to provide an indicator cap as set forth hereinabove, further including a second fluid passageway extending through the neck portion from an opened terminal end thereof to the cavity of the head portion, the opened terminal end of the second fluid passageway being positioned lower than the opened terminal end of the first fluid passageway.

Another object of this invention is to provide an indicator cap as set forth hereinabove, further including boot means having a side opening positioned over the terminal end of the neck portion to permit filling of the cavity while preventing drainage of the first fluid passageway when positioned horizontally with the side opening positioned upwardly.

Another object of this invention is to provide an indicator cap as set forth hereinabove, further including boot means attached to a bottom wall of the reservoir, the boot means including a side opening to permit filling of the cavity while preventing drainage of the first fluid passageway when positioned horizontally with the side opening positioned horizontally.

Another object of this invention is to provide an indicator cap as set forth hereinabove, wherein the pump means comprises a resilient bellow having one end sealingly positioned about the first fluid passageway, and a transparent diaphragm sealingly positioned over the other end of the bellow, whereby, upon depressing of the diaphragm, the bellow flexes to force air from the cavity outwardly through the first fluid passageway and, upon release, the resiliency of the bellow draws rinse agent through the first fluid passageway into the cavity to be visually observed.

Another object of this invention is to provide an indicator cap as set forth hereinabove, further including a retaining ring positioned about the diaphragm to sealingly engage the diaphragm to the other end of the bellow.

Another object of this invention is to provide an indicator cap as set forth hereinabove, wherein the pump means comprises a resilient diaphragm sealingly positioned over the cavity whereby, upon depressing of the diaphragm, the diaphragm flexes inwardly to force air in the cavity outwardly through the first fluid passageway and, upon release, the resiliency of the diaphragm draws rinse agent through the first fluid passageway into the cavity to be visually observed.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises an indicator cap for visually indicting the low level of a rinse agent in a reservoir of a rinse agent dispenser in a dishwasher.

More particularly, the indicator cap of the invention comprises an elongated body having a head portion forming a cavity and a depending neck portion. The neck portion is operatively designed to sealingly engage the opening in the rinse agent reservoir. The neck portion comprises two fluid passageways extending from the lowermost tip of the neck portion, through the neck portion and into the cavity of the head portion.

The head portion of the body is adapted to sealingly receive a pump mechanism having a translucent or transparent top. With the reservoir being filled with a colored rinse agent (usually blue), pumping of the pump causes the rinse agent to flow upwardly through the fluid passageways into the cavity to visually indicate the filled condition of the reservoir. The tip of the neck portion is angularly formed so that the first fluid passageway terminates at a position above the terminal end of the second fluid passageway. The shorter length of the first fluid passageway allows air to flow upwardly therethrough when the level of the rinse agent in the reservoir falls below the terminal end of the first fluid passageway. The cavity is then drained of the rinse agent via the second fluid passageway.

During start-up, the indicator cap is removed and the reservoir is filled with the rinse agent. The pump is mechanism is operated to fill the cavity. As the rinse agent is dispensed during each dishwashing cycle, the rinse agent level in the reservoir decreases. However, the cavity remains filled with the rinse agent because both terminal ends of the fluid passageways are below the level of the rinse agent in the reservoir. After continued use, the rinse agent level in the reservoir decreases to a low level point below the terminal end of the first fluid passageway. Air is then allowed to flow upwardly through the first fluid passageway into the cavity, causing drainage of the rinse agent in the cavity via the second fluid passageway back into the reservoir. Since the cavity is drained of the colored rinse agent, the transparent top of the pump visually indicates the low level condition of the reservoir to the consumer. This advance notice encourages the consumer to purchase a bottle of the rinse agent during the next trip to the grocery store.

The foregoing has outlined rather broadly the more pertinent and important features of the present invention in order that the detailed description of the invention that follows may be better understood so that the present contribution to that the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
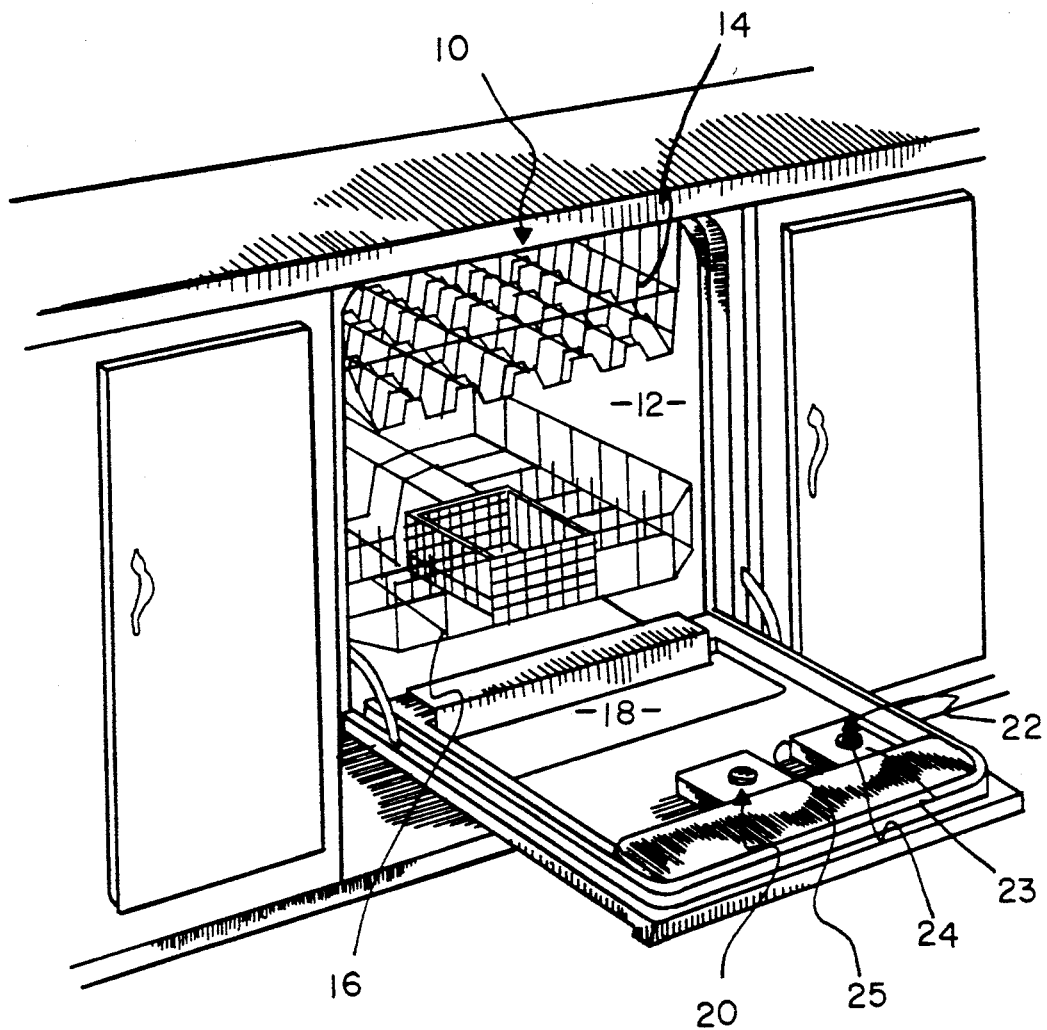
FIG. 1 is a perspective view of a front opening dishwasher illustrating the dishwasher door having a rinse agent dispenser positioned within the door thereof.

Referring to FIG. 1, a front loading dishwasher 10 comprises a front opening tub 12 having top and bottom dish racks 14 and 16 reciprocatably mounted therein. The dishwasher 10 further comprises a door 18 hingely connected to the lower edge of the tub 12. The door 18 is designed to sealingly engage over the front opening of the tub 12 when in a vertical, closed position (not shown). When opened to a horizontal position as shown, dishes may be loaded into or removed from the racks 14 or 16.

A detergent dispenser, generally indicated by numeral 20, is positioned on the inside of the door 18. The detergent dispenser 20 is designed to be filled with dishwashing detergent for dispensing into the tub 12 during the wash cycle.

A rinse agent dispenser, generally indicated by numeral 22, is also positioned on the inside of the dishwasher door 18. The rinse agent dispenser 22 is designed to be filled with a rinse agent via an opening 23 in the dispensing reservoir 25 for dispensing into the tub 12 during the rinse cycle. The present invention comprises a removable indicator cap, generally indicated by numeral 24, which extends into the reservoir 25 to visually indicate a low level of rinse agent in the dispenser's reservoir 25.

Figure 2:
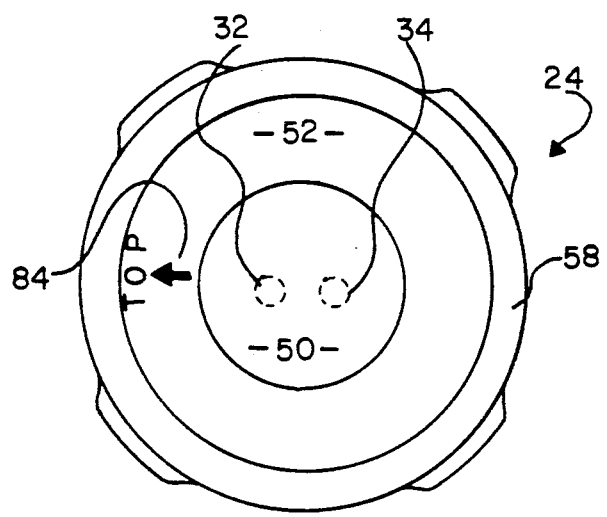
FIG. 2 is a top view of the indicator cap of the invention.
Figures 3, 4:
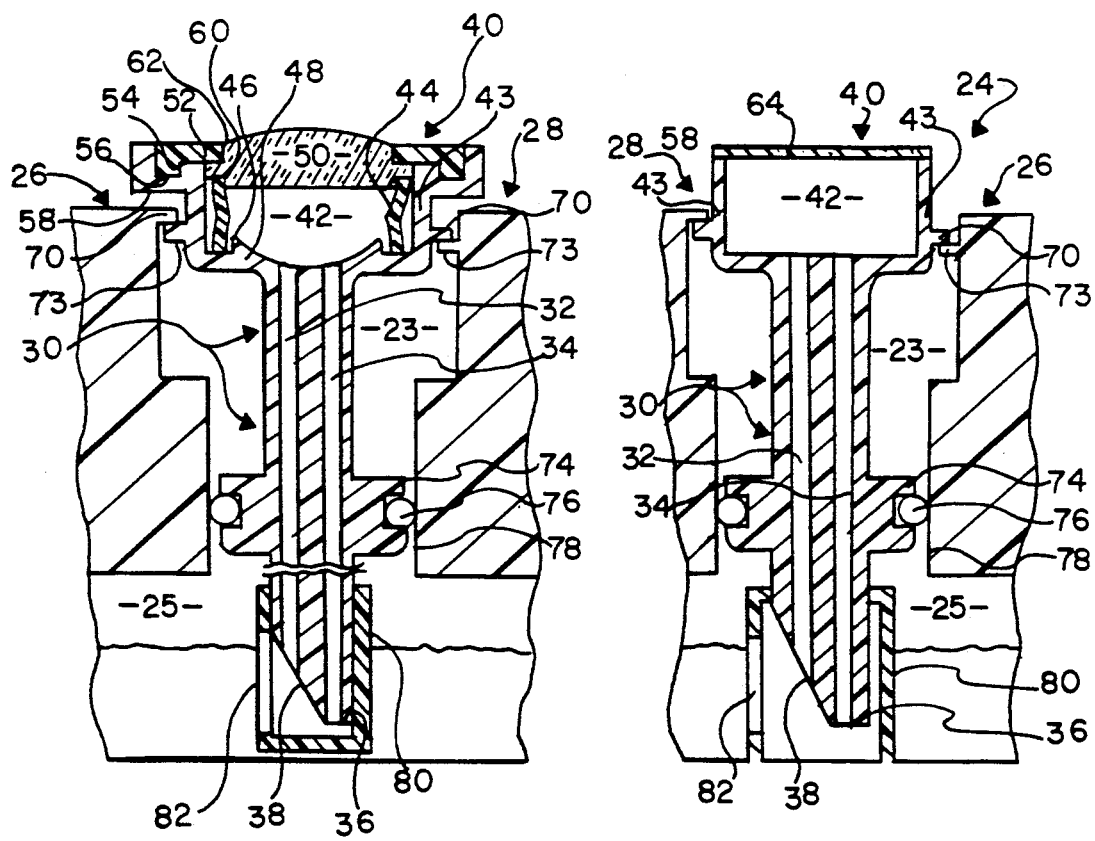
FIG. 3 is a cross-sectional view of FIG. 2 along lines 3—3 illustrating the two fluid passageways extending through the neck portion of the body of the indicator cap and illustrating the first embodiment of the pump mechanism.
FIG. 4 is a partial cross-sectional view illustrating the second embodiment of the pump mechanism.

More particularly, referring to FIGS. 2 and 3, the indicator cap 24 of the invention comprises a body, generally indicated by numeral 26, having a head portion 28 and a elongated neck portion 30. First and second fluid passageways 32 and 34 are positioned longitudinally within the neck portion 30 and extend from the head portion 28 to the terminal end 36 of the neck portion 30. The terminal end 36 of the neck portion 30 is formed at an angle 38 through the first fluid passageway 32 so that the first fluid passageway 32 is formed shorter than the second fluid passageway 34. The neck portion 30 is dimensioned to extend into a bottommost area of the reservoir 25.

The head portion 28 of body 26 is adapted to receive a pump, generally indicated by numeral 40, for pumping rinse agent upwardly through the fluid passageways 32 and 34 into a cavity 42 formed by upstanding annular wall 43 in the head portion 28.

In the first embodiment shown in FIG. 3, pump mechanism 40 comprises an annular bellow 44 composed of a resilient material which sealingly engages an annular slot 46 formed in the bottom 48 of the cavity 42. A rigid diaphragm 50, composed of a translucent (or transparent) material, sealingly engages over the other end of the bellow 44. The diaphragm 50 is secured into position by means of a retaining ring 52 having depending lip 54 which securely engages into annular slot 56 formed in the upper edge 58 of the annular wall 43 of the head portion 48. The diaphragm 50 may include upper and lower annular steps 60 and 62 for concentrically locating the diaphragm 50 in engagement with the bellow 44 and the retaining ring 52.

During use, depression of the diaphragm 50 causes the resilient wall of bellow 44 to flex and force air in the cavity 42 downwardly through fluid passageways 32 and 34. Upon release of the diaphragm 50, the memory of the resilient bellow 44 forces the diaphragm upwardly to pump rinse agent upwardly through the fluid passageways 32 and 34 into the cavity 42.

In the second embodiment shown in FIG. 4, pump mechanism 40 comprises a resilient translucent (or transparent) diaphragm 64 which is hermetically sealed to the annular upper edge 58 of the annular wall 43 of the cavity 42. Similar to the first embodiment, depressing of the diaphragm 64 causes the diaphragm to flex inwardly to force air in the cavity 42 downwardly out the fluid passageways 32 and 34. Upon release, the memory of the resilient diaphragm 64 draws the rinse agent through the fluid passageways 32 and 34 into the cavity 42. The translucence of the diaphragm 64 allows the consumer to see the rinse agent in the cavity 42.

Referring to FIG. 3, indicator cap 24 of the invention is designed to sealingly engage in the opening 23 of the reservoir 25 of the rinse agent dispenser 22. In this regard, indicator cap 24 may be configured to replace the existing fill cap of existing dishwasher rinse agent dispensers 24, in which case appropriate threads 70 may be formed externally of the neck portion 30 of the body 26 so as to threadably engage the existing threads 73 of the reservoir's opening 23. Similarly, the neck portion 30 may be configured with an annular slot 74 to receive a conventional O-ring 76 for sealing with the lumen 78 of the reservoir's opening 23. However, it should be understood that many configurations are possible without departing from the spirit and scope of this invention.

Finally, it is noted that cavity 42 of the head portion 28 may drain when the dishwasher door 18 is moved from its open, horizontal position to its closed, vertical position since the fluid passageways 32 and 34 will then be positioned horizontally and, except when the reservoir 25 is nearly full, the ends thereof will be exposed to air in the reservoir 25. In order to prevent drainage of the cavity 42 when the fluid passageways 32 and 34 are positioned horizontally, the neck portion 30 may be fitted with a boot 80 with side opening 82 which sealingly engages over the fluid passageways 32 and 34 about the terminal end 36 of the neck portion 30. The side opening 82 allows the rinse agent and air to flow into the fluid passageways 32 and 34 when the neck portion 30 is positioned vertically (door opened, horizontal position), but traps a small amount of rinse agent in the boot 80 to prevent air from flowing into either of the fluid passageways 32 and 34 when the neck portion 30 is positioned horizontally (door closed, vertical position). In this regard, since opening 82 must face upwardly when the neck portion 30 is horizontally positioned, a suitable indicator arrow 84 is formed on the uppermost surface of the retaining ring 52 of the indicator cap 24 (see FIG. 2). Alternatively, threads 70 and 72 may be configured to allow threaded engagement only upon proper orientation of the opening 82 of the boot 80.

As shown in FIG. 4, boot 80 may be integrally molded within the bottom 86 of the reservoir 25 without departing from the spirit and scope of this invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention. Now that the invention has been described,

What is claimed is:

1. An indicator cap for indicating a low level of rinse agent in a reservoir of a dishwasher rinse agent dispenser, comprising in combination:
    a body including a head portion having a cavity formed therein and a neck portion;
    means for sealing said body in said reservoir by vertically mounting said body into an opening in the reservoir with said neck portion extending downwardly into a bottommost area of the reservoir;
    a fluid passageway extending through said neck portion from an opened terminal end thereof to said cavity of said head portion;
    visual pump means for pumping rinse agent through said first fluid passageway into said cavity to visually indicate the presence of the rinse agent in said cavity; and
    boot means having a side opening positioned over said terminal end of said neck portion to permit filling of said cavity while preventing drainage of said first fluid passageway when positioned horizontally with said side opening positioned upwardly,
    whereby, air is allowed to flow upwardly through said first fluid passageway when the level of rinse agent in the reservoir is below said opened terminal end of said first fluid passageway causing drainage of rinse agent in said cavity to visually indicate a low level condition.

2. An indicator cap for indicating a low level of rinse agent in a reservoir of a dishwasher rinse agent dispenser, comprising in combination:
    a body including a head portion having a cavity formed therein and a neck portion;
    means for sealing said body in said reservoir by vertically mounting said body into an opening in the reservoir with said neck portion extending downwardly into a bottommost area of the reservoir;
    a fluid passageway extending through said neck portion from an opened terminal end thereof to said cavity of said head portion;
    visual pump means for pumping rinse agent through said first fluid passageway into said cavity to visually indicate the presence of the rinse agent in said cavity;
    boot means attached to a bottom wall of the reservoir, the boot means including a side opening to permit filling of said cavity while preventing drainage of said first fluid passageway when positioned horizontally with said side opening positioned horizontally,
    whereby, air is allowed to flow upwardly through said first fluid passageway when the level of rinse agent in the reservoir is below said opened terminal end of said first fluid passageway causing drainage of rinse agent in said cavity to visually indicate a low level condition.

3. An indicator cap for indicating a low level of rinse agent in a reservoir of a dishwasher rinse agent dispenser, comprising in combination:
    a body including a head portion having a cavity formed therein and a neck portion;
    means for sealing said body in said reservoir by vertically mounting said body into an opening in the reservoir with said neck portion extending downwardly into a bottommost area of the reservoir;

a fluid passageway extending through said neck portion from an opened terminal end thereof to said cavity of said head portion;

visual pump means for pumping rinse agent through said first fluid passageway into said cavity to visually indicate the presence of the rinse agent in said cavity, said pump means comprising:

a resilient bellow having one end sealingly positioned about said first fluid passageway; and a transparent diaphragm sealingly positioned over the other end of said bellow, whereby, upon depressing of said diaphragm said bellow flexes to force air from said cavity outwardly through said first fluid passageway and, upon release, said resiliency of said bellow draws rinse agent through said first fluid passageway into said cavity to be visually observed; and a retaining ring positioned about said diaphragm to sealingly engage said diaphragm to the other end of said bellow, whereby, air is allowed to flow upwardly through said first fluid passageway when the level of rinse agent in the reservoir is below said opened terminal end of said first fluid passageway causing drainage of rinse agent in said cavity to visually indicate a low level condition.

* * * * *